United States Patent
Suga et al.

(10) Patent No.: US 7,008,066 B2
(45) Date of Patent: Mar. 7, 2006

(54) ANTIGLARE FILM PROCESS FOR PRODUCING THE SAME, AND DISPLAY DEVICE USING ANTIGLARE FILM

(75) Inventors: Taiji Suga, Shinjuku-Ku (JP); Tadahiro Masaki, Shinjuku-Ku (JP); Fumihiro Arakawa, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 175 days.

(21) Appl. No.: 10/781,816

(22) Filed: Feb. 20, 2004

(65) Prior Publication Data

US 2004/0160674 A1 Aug. 19, 2004

Related U.S. Application Data

(62) Division of application No. 10/021,082, filed on Dec. 19, 2001, now abandoned.

(30) Foreign Application Priority Data

Dec. 20, 2000 (JP) ......................................... 2000-386189

(51) Int. Cl.
*G02B 17/00* (2006.01)

(52) U.S. Cl. .................... 359/603; 359/604; 359/900
(58) Field of Classification Search ......... 359/603–609, 359/601–602, 900, 582
See application file for complete search history.

(56) References Cited

U.S. PATENT DOCUMENTS

| 5,709,447 | A | 1/1998 | Murakami et al. ............. 362/31 |
| 5,909,314 | A | 6/1999 | Oka et al. .................... 359/582 |
| 5,961,197 | A | 10/1999 | Watai et al. .................. 362/31 |
| 6,171,457 | B1 * | 1/2001 | Kim ...................... 204/192.28 |
| 6,238,631 | B1 | 5/2001 | Ogata et al. .............. 422/186.3 |
| 6,333,592 | B1 | 12/2001 | Sasa et al. ................... 313/112 |
| 6,417,619 | B1 | 7/2002 | Yasunori et al. ............. 313/582 |
| 6,419,366 | B1 | 7/2002 | Namioka .................... 359/601 |
| 6,476,969 | B1 | 11/2002 | Oka et al. .................... 359/582 |
| 6,489,015 | B1 | 12/2002 | Tsuchiya et al. ............. 428/212 |
| 6,505,942 | B1 | 1/2003 | Ohishi et al. ............... 359/601 |

* cited by examiner

*Primary Examiner*—Mohammad Sikder
(74) *Attorney, Agent, or Firm*—Parkhurst & Wendel, L.L.P.

(57) ABSTRACT

Disclosed is an antiglare film having excellent durability. The antiglare film is disposed on the front of a display device and comprises a transparent plastic film and, formed on the transparent plastic film, at least an antiglare layer having fine concaves and convexes on its surface, wherein the antiglare layer is formed of a transparent resin and satisfies requirements that: (1) the surface of the antiglare layer has a three-dimensional ten-point mean roughness of 0.9 $\mu$m to 3 $\mu$m; and (2) the mean spacing between adjacent profile peaks on a three-dimensional roughness reference plane is 20 $\mu$m to 50 $\mu$m.

8 Claims, 2 Drawing Sheets

# ANTIGLARE FILM PROCESS FOR PRODUCING THE SAME, AND DISPLAY DEVICE USING ANTIGLARE FILM

BACKGROUND OF THE INVENTION

1. Field of the Invention

The present invention relates to an antiglare film which, in use, is disposed on the front of various display devices, such as liquid crystal display devices, or an antiglare film which is durable against touch inputting. The present invention also relates to a production process which can produce said antiglare film with high efficiency by means of a molding tool having concaves and convexes on its surface, preferably a molding roller. Further, the present invention relates to a display device comprising said antiglare film disposed on the front of a liquid crystal display device or the like.

2. Background Art

Various display devices (=displays) for displaying static images or moving images according to electronic information are known, and CRTs, plasma displays, liquid crystal displays, electroluminescence displays and the like are currently on the market.

FIG. 1 shows an example of a liquid crystal display device 100. The liquid crystal display device 100 comprises: a liquid crystal panel 101 comprising two polarizing plates 101a, 101a' and a liquid crystal display cell 101b sandwiched between the two polarizing plates 101a, 101a'; and a surface light source device 102 disposed on the underside (as viewed in the drawing) (which, in use of the liquid crystal display device 100, corresponds to a side opposite to the viewer side) of the liquid crystal display device 100.

The surface light source device 102 comprises, for example, a reflector plate 103, a light guide plate 104 having a dot pattern 104a on its underside, a light diffusive film 105, a lens sheet 106, and a protective film 107 provided in that order from the lower side.

In driving a liquid crystal display device to view images, an image of an object present behind the viewer is reflected from the screen of the liquid crystal display, and the viewer often catches the reflected image. In particular, when there is indoor lighting equipment and outdoor light behind the viewer, an image of the sun or the like is reflected from the display. This significantly deteriorates the visibility of images.

A touch panel is one input means of computers. Among others, a touch panel operated on the screen of display devices is convenient because sites to be selected and touched can be freely prepared and displayed on the screen of the display devices.

Touch inputting with high frequency is causative of the deposition of fingerprints or the occurrence of scratches, and, in this case, in addition, various types of durability are required of the touch panel.

In order to prevent a catch of an image of indoor lighting equipment or the sun on the screen, a matte film prepared by coating a coating composition with organic or inorganic fine beads incorporated therein onto a transparent plastic film and then drying or solidifying the coating to form an antiglare layer has hitherto been used.

Organic or inorganic fine beads, which have hitherto been used in the antiglare film, however, suffer from an unavoidable problem that the beads come off in service and scratch the antiglare film. In addition, at the time of the production of the antiglare film, in coating the coating composition with beads incorporated thereinto, unfavorable phenomena, such as occurrence of streaks or uneven coating, occur making it difficult to provide even antiglare properties.

Further, in using the antiglare film thus obtained as a surface material of a touch panel, beads, which have come off, scratches the antiglare film upon the application of pressure by a finger or a touch pen. Thus, the beads accelerate the occurrence of scratches.

SUMMARY OF THE INVENTION

Accordingly, it is an object of the present invention to solve the problems involved in the conventional antiglare film attributable to organic or inorganic fine beads contained in the antiglare layer, that is, susceptibility to scratching, uneven properties, and, in the case of the application of the antiglare film to a touch panel, accelerated occurrence of scratches.

The above object of the present invention could have been attained by forming an antiglare layer in an antiglare film while specifying the three-dimensional ten-point mean roughness and the mean spacing between adjacent convexes (profile peaks) in convexes and concaves of the antiglare layer or while specifying haze in addition to these parameters.

The antiglare film may be provided with a primer layer, preferably a primer layer containing transparent fine particles.

According to one aspect of the present invention, there is provided an antiglare film to be disposed on a front of a display device, said antiglare film comprising:

a transparent plastic film and an antiglare layer, the antiglare layer being formed on a surface of the transparent plastic film, the antiglare layer having fine concaves and convexes on its surface, wherein said antiglare layer is formed of a transparent resin and satisfies requirements that:

(1) the surface of the antiglare layer has a three-dimensional ten-point mean roughness of 0.9 $\mu$m to 3 $\mu$m; and (2) the mean spacing between adjacent profile peaks on a three-dimensional roughness reference plane is 20 $\mu$m to 50 $\mu$m.

Preferably, the antiglare film according to the first aspect of the present invention is disposed on the front of a display device, said antiglare film comprising a transparent plastic film; and, formed on the transparent plastic film, at least an antiglare layer having fine concaves and convexes on its surface, wherein said antiglare layer is formed of a transparent resin and satisfies requirements that:

(1) the surface of the antiglare layer has a three-dimensional ten-point mean roughness of 0.9 $\mu$m to 3 $\mu$m; and (2) the mean spacing between adjacent profile peaks on a three-dimensional roughness reference plane is 20 $\mu$m to 50 $\mu$m.

Preferably, the antiglare film has a total light transmittance of not less than 87% and a haze of 5 to 40.

Preferably, the transparent resin is a cured product of an ionizing radiation-curable resin.

Preferably, a primer layer is provided between the transparent plastic film and the antiglare layer.

The primer layer may comprise transparent fine particles.

According to another aspect of the present invention, there is provided a process for producing an antiglare film, comprising the steps of:

providing a molding tool having on its surface concaves and convexes, which have an inverted shape of concaves and convexes on the surface of an antiglare layer to be formed and satisfy the following requirements (1) and (2), and forming an ionizing radiation-curable resin between the concave/convex mold face and the transparent plastic film to form a laminate (step of forming);

while maintaining the formed state, applying an ionizing radiation to the ionizing radiation-curable resin to form a cured product of the ionizing radiation-curable resin and, at the same time, adhering the cured product to the transparent plastic film to form an antiglare layer of the cured product with concaves and convexes, which have an inverted shape of the concaves and convexes on the surface of the molding tool, formed thereon (step of curing), and then separating the laminate of the antiglare layer and the transparent plastic film from the concave/convex face of the molding tool (step of separation):

(1) the surface of the inverted concave/convex shape has a three-dimensional ten-point mean roughness of 0.9 μm to 3 μm; and (2) the mean spacing between adjacent profile peaks on a three-dimensional roughness reference plane is 20 μm to 50 μm.

Preferably, the production process according to the second aspect of the present invention comprises the steps of:

bringing a transparent plastic film in a molding tool having on its surface concaves and convexes which have an inverted shape of fine concaves and convexes of the antiglare layer to be formed;

placing, by coating, an ionizing radiation-curable resin between the transparent plastic film and the molding tool;

applying an ionizing radiation to the ionizing radiation-curable resin to cure the ionizing radiation-curable resin and to adhere the cured product of the ionizing radiation-curable resin to the transparent plastic film to form an antiglare layer having fine concaves and convexes on its surface; and separating the transparent plastic film with the antiglare layer formed thereon from the molding tool, said antiglare layer satisfying requirements that:

(1) the surface of the antiglare layer has a three-dimensional ten-point mean roughness of 0.9 μm to 3 μm; and (2) the mean spacing between adjacent profile peaks on a three-dimensional roughness reference plane is 20 μm to 50 μm.

In the production process according to the second aspect of the present invention, a construction may be adopted wherein the molding tool is a roller, the step of forming is carried out while winding the transparent plastic film on the molding tool in a roller form, and the step of curing is carried out on the molding tool in a roller form.

The transparent plastic film may have a primer layer formed on its side on which an ionizing radiation-curable resin is to be formed.

The primer layer may contain transparent fine particles.

According to a further aspect of the present invention, there is provided an antiglare film produced by any one of the above production processes.

According to a still further aspect of the present invention, there is provided a display device comprising any one of the above antiglare films disposed on the front of a display device.

DETAILED DESCRIPTION OF THE INVENTION

Figure 2:
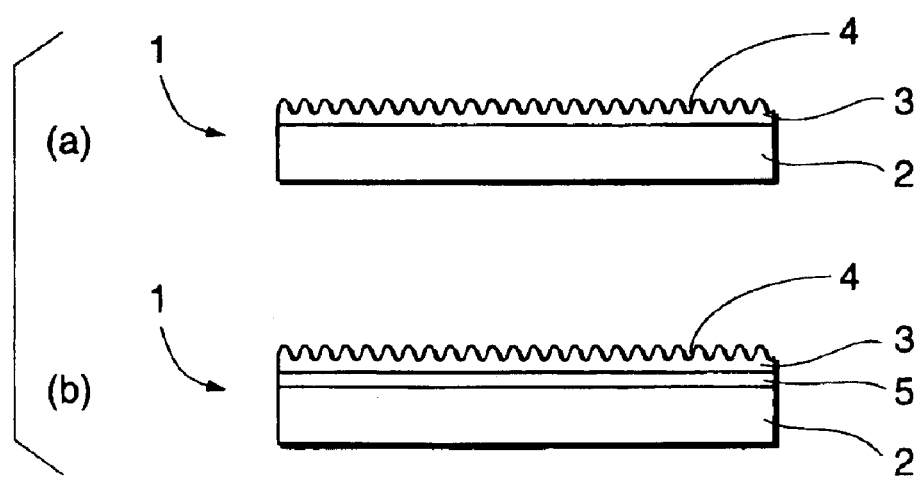
FIG. 2 is a cross-sectional view of the antiglare film according to the present invention.

As shown in FIG. 2A, an antiglare film 1 according to the present invention comprises a transparent plastic film 2 and, formed on one side of the transparent plastic film 2 (upper surface in the drawing), an antiglare layer 3 having concaves and convexes 4 on its upper surface, or alternatively as shown in FIG. 2B, comprises a transparent plastic film 2 and, formed on the upper surface of the transparent plastic film 2, a primer layer 5 and an antiglare layer 3 having concaves and convexes 4 on its upper surface.

The concaves and convexes 4 in the antiglare layer 3 satisfy requirements that:

(1) the surface of the antiglare layer has a three-dimensional ten-point mean roughness of 0.9 μm to 3 μm; and (2) the mean spacing between adjacent profile peaks on a three-dimensional roughness reference plane is 20 μm to 50 μm.

The three-dimensional ten-point mean roughness in the requirement (1) is a measured value based on JIS B 0601-1994. More specifically, a reference length is sampled from a profile curve of an object, and an average line is determined, followed by the calculation of a difference between the average value of the heights of five highest profile peaks and the depths of five deepest profile valleys. This difference value is regarded as the ten-point mean roughness.

Regarding the requirement (1), the three-dimensional ten-point mean roughness of the concaves and convexes 4 is preferably in the range of 0.9 μm to 3 μm.

When the three-dimensional ten-point mean roughness is less than 0.9 μm, the level of concaves and convexes is too small to prevent "external light reflection" wherein, for example, an image of indoor lighting equipment or the sun behind the viewer is reflected from the display and, consequently, the viewer catches the reflected image. On the other hand, when the three-dimensional ten-point mean roughness exceeds 3 μm, the haze is increased. Therefore, when the viewer views the display through the antiglare film, the clouding level of the screen is increased and, as a result, the contrast of images is significantly deteriorated.

In realizing images having a high contrast, the three-dimensional ten-point mean roughness is more preferably 0.9 μm to 1.3 μm.

The mean spacing Sm between adjacent profile peaks on the three-dimensional roughness reference plane in the requirement (2) is measured according to JIS B 0601-1994 and, when n profile peaks with spacings $S_{m1}, S_{m2}, S_{m3}, \ldots, S_{mn}$ exist in the reference length, is determined as $S_m = (1/n) \times (S_{m1} + S_{m2} + S_{m3} + \ldots + S_{mni})$. The three-dimensional ten-point mean roughness is preferably 20 μm to 50 μm. When the three-dimensional ten-point mean roughness is less than 20 μm, the image sharpness is lowered, while, when the three-dimensional ten-point mean roughness exceeds 50 μm, the "external light reflection" cannot be prevented.

The antiglare film according to the present invention satisfies the requirements (1) and (2) and, preferably, at the same time, has a total light transmittance of not less than 87% and a haze of 5 to 40.

When the total light transmittance is less than 87%, the use of the antiglare film disadvantageously lowers the brightness of images. So far as the total light transmittance is not less than 87%, the higher the total light transmittance, the better the results. The construction of the antiglare film according to the present invention comprising a transparent plastic film 2, an antiglare layer 3 formed on the transparent plastic film 2, and optionally a primer layer interposed between the transparent plastic film 2 and the antiglare layer 3 provides a total light transmittance up to about 92%.

When the haze is less than 5, although the image sharpness is increased, bright points randomly occur and, consequently, glare of the screen cannot be avoided. On the other hand, when the haze exceeds 40, the image sharpness is disadvantageously lowered. The haze is more preferably not more than 30 from the viewpoint of ensuring the image sharpness.

In order to overcome the drawbacks of the prior art, concaves and convexes may be imparted to the resin layer, not containing organic or inorganic fine beads for the formation of concaves and convexes, to provide the antiglare film 1 according to the present invention.

Imparting the concaves and convexes may be carried out by the so-called "embossing method" wherein an embossing plate, preferably an embossing roller in a roller form, is pressed, optionally with heating, to a resin layer after or during the formation thereof. Preferably, a more efficient method may be adopted which comprises the steps of: providing a concave/convex mold having on its surface concaves and convexes, which have an inverted shape of desired concaves and convexes of an antiglare layer to be formed; coating a highly curable resin composition, such as an ultraviolet-curable resin, onto the mold surface; covering the coating with a transparent plastic film; applying ultraviolet light to cure the ultraviolet-curable resin or the like within the concave/convex mold and, in addition, integrating the cured coating with the transparent plastic film to form a laminate; and then separating the laminate from the concave/convex mold.

In this case, the resin composition may be coated onto the transparent plastic film followed by the application of the assembly to the concave/convex mold. Alternatively, a method may be used wherein the resin composition is supplied to the interface between the transparent plastic film and the concave/convex mold to simultaneously perform coating and forming. In any event, what is required here is to sandwich the resin composition between the concave/convex mold and the transparent plastic film.

The method wherein the resin composition is sandwiched between the concave/convex mold and the transparent plastic film, is superior particularly in the reproducibility of the mold, to the embossing method. Therefore, this sandwich method is advantageous in that contemplated optical characteristics can be easily provided and, in addition, a fine and hard concave/convex layer can be formed without posing a problem of a product, obtained by the so-called "embossing method," such that the concaves and convexes of the product are returned to an original flat state with the elapse of time.

Figure 3:
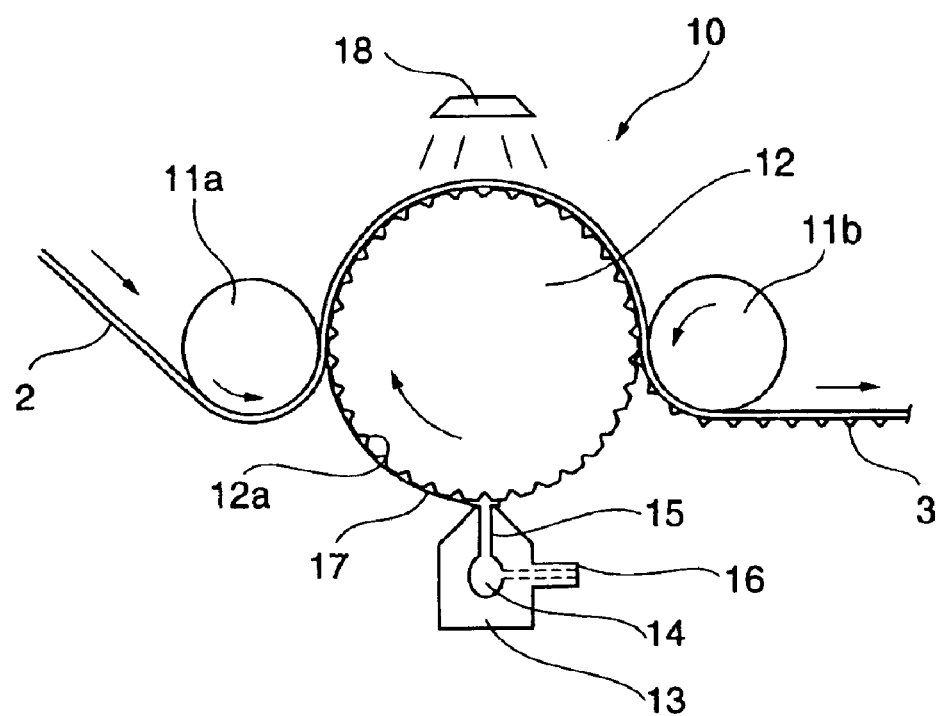
FIG. 3 is a diagram showing an embodiment of an apparatus for producing an antiglare film.

FIG. 3 is a diagram illustrating a production process using an embossing device 10 wherein the above-described ultraviolet-curable resin or the like is used.

At the outset, a transparent plastic film 2 is unwound from left, and is supplied toward an embossing roller 12. The surface of the embossing roller 12 is an concave/convex mold face having concaves and convexes 12a which have an inverted shape of desired concaves and convexes of an antiglare layer to be formed.

A coating head 13 is installed at the bottom of the embossing roller 12, and an ultraviolet-curable resin composition 14 is fed from a liquid reservoir (not shown) through a pipe 16 to the coating head 13. The fed ultraviolet-curable resin composition 14 is extruded through a slit 15, which is opened toward the upper part of the coating head 13, and is deposited onto the embossing roller 12 in its molding face having concaves and convexes 12a. The deposited ultraviolet-curable resin composition is then moved left by the rotation of the embossing roller 12 (in the drawing, rotation in clockwise direction), and the transparent plastic film 2 and an ultraviolet-curable resin composition layer 17 are laminated onto each other between the embossing roller 12 and the nip roller 11a on the film feed side.

Instead of this method wherein the ultraviolet-curable resin composition 14 is deposited onto the mold face followed by lamination of the transparent plastic film 2 onto the coating, a method may be adopted wherein, while winding the transparent plastic film 2 on the embossing roller 12, the ultraviolet-curable resin composition 14 is fed into between the transparent plastic film 2 and the embossing roller 12 to laminate the ultraviolet-curable resin composition layer 17 onto the transparent plastic film 2.

The laminate of the transparent plastic film 2 and the ultraviolet-curable resin composition layer 17 is moved to the upper part of the embossing roller 12, and is irradiated with ultraviolet light from an ultraviolet exposure system 18 installed above the embossing roller 12 to cure the ultraviolet-curable resin composition layer 17 and to adhere the cured product to the transparent plastic film 2.

The laminate of the transparent plastic film 2 and the cured ultraviolet-curable resin composition layer 17 is moved to the right side of the embossing roller 12, and is separated by means of a separation roller 11b from the embossing roller 12. Thus, an antiglare film is prepared which comprises a transparent plastic film 2 and, formed on the transparent plastic film 2, concaves and convexes 3, of a cured product of the ultraviolet-curable resin, which have an inverted shape of the concaves and convexes in the concave/convex mold face of the embossing plate.

In this case, preferably, the material of the transparent plastic film 2 is transparent and smooth and, in addition, does not contain any foreign matter. Further, preferably, the transparent plastic film 2 is mechanically strong from the viewpoints of working and use applications.

Generally preferred examples of the transparent plastic film 2 include films of thermoplastic resins, for example, cellulose diacetate, cellulose triacetate, cellulose acetate butyrate, polyamide, polyimide, polyethersulfone, polysulfone, polypropylene, polymethylpentene, polyvinyl chloride, polyvinyl acetal, polyether ketone, polymethyl methacrylate, polycarbonate, polyesters, such as polyethylene terephthalate, and polyurethane.

Films of polyester resins, such as polyethylene terephthalate resins, extensively used in photographic films having an emulsion layer are preferred as the transparent plastic film 2 from the viewpoints of mechanical strength and coatability. Cellulose triacetate and the like are preferred from the viewpoints of high transparency, freedom from optical anisotropy, and low refractive index. Polycarbonate is preferred from the viewpoints of transparency and heat resistance.

These thermoplastic resin films are flexible and easy to handle. When there is no need to bend the material including the time of handling and, at the same time, when a hard material is desired, plates of the above resins, glass plates or other plates may also be used.

The thickness is preferably about 8 to 1000 µm, more preferably about 50 to 200 µm. In the case of plates, the thickness may exceed this thickness range.

In order to improve the adhesion between the transparent plastic film 2 and a layer to be formed thereon, any one of or both the upper surface and the lower surface of the transparent plastic film 2 may be subjected to conventional various physical and chemical treatments, such as corona discharge treatment and oxidation treatment, or may be previously coated with an anchor agent or a coating material called a primer to form a primer layer 5.

As described later, optical functions may be imparted to the primer layer 5.

In the embodiment shown in FIG. 3, in forming the concave/convex layer 3, an ultraviolet light-curable resin composition has been used. In this case, ionizing radiation-curable resin compositions including electron beam-curable resin compositions may be used.

The ionizing radiation-curable resin composition may be a mixture prepared by properly mixing prepolymer, oligomer, and/or monomer, having a polymerizable unsaturated bond or an epoxy group in the molecule thereof, together. Ionizing radiations applicable for curing include electromagnetic radiations or charged particle beams which have energy quantum high enough to polymerize or crosslink the molecule. In general, ultraviolet light or electron beam is used.

Examples of prepolymers and oligomers usable in the ionizing radition-curable resin composition include: unsaturated polyesters, such as condensates of unsaturated dicarboxylic acids with polyhydric alcohols; methacrylates, such as polyester methacrylate, polyether methacrylate, polyol methacrylate, and melamine methacrylate; acrylates, such as polyester acrylate, epoxy acrylate, urethane acrylate, polyether acrylate, polyol acrylate, and melamine acrylate; and cationically polymerizable epoxy compounds.

Examples of monomers usable in the ionizing radiation-curable resin composition include: styrene monomers, such as styrene and α-methylstyrene; acrylic esters, such as methyl acrylate, 2-ethylhexyl acrylate, methoxyethyl acrylate, butoxyethyl acrylate, butyl acrylate, methoxybutyl acrylate, and phenyl acrylate; methacrylic esters, such as methyl methacrylate, ethyl methacrylate, propyl methacrylate, methoxyethyl methacrylate, ethoxymethyl methacrylate, phenyl methacrylate, and lauryl methacrylate; unsaturated substituted amino alcohol esters, such as 2-(N, N-diethylamino)ethyl acrylate, 2-(N,N-dimethylamino) ethyl acrylate, 2-(N,N-dibenzylamino)methyl acrylate, and 2-(N,N-diethylamino)propyl acrylate; unsaturated carboxylic acid amides, such as acrylamide and methacrylamide; compounds, such as ethylene glycol diacrylate, propylene glycol diacrylate, neopentyl glycol diacrylate, 1,6-hexanediol diacrylate, and triethylene glycol diacrylate; polyfunctional compounds, such as dipropylene glycol diacrylate, ethylene glycol diacrylate, propylene glycol dimethacrylate, and diethylene glycol dimethacrylate; and polythiol compounds having two or more thiol groups in the molecule thereof, for example, trimethylolpropane trithioglycolate, trimethylolpropane trithiopropylate, and pentaerythritol tetrathioglycolate.

In general, one or a mixture of two or more compounds described above is used as the monomer in the ionizing radiation-curable resin composition. Preferably, however, in order to impart usual coatability to the ionizing radiation-curable resin composition, the ionizing radiation-curable resin composition comprises not less than 5% by weight of the prepolymer or the oligomer and not more than 95% by weight of the monomer and/or the polythiol compound.

When flexibility is required of a cured product of the ionizing radiation-curable resin composition, the amount of the monomer may be reduced, or alternatively, an acrylate monomer having one or two functional groups may be used. When a cured product of the ionizing radiation-curable resin composition is required to have abrasion resistance, heat resistance, and solvent resistance, for example, an acrylate monomer having three or more functional groups may be used. Thus, the degree of freedom in the design of the ionizing radiation-curable resin composition is high. Here acrylate monomers having one functional group include 2-hydroxy acrylate, 2-hexyl acrylate, and phenoxyethyl acrylate. Acrylate monomers having two functional groups include ethylene glycol diacrylate and 1,6-hexanediol diacrylate. Acrylate monomers having three or more functional groups include trimethylolpropane triacrylate, pentaerythritol triacrylate, pentaerythritol tetraacryalte, and dipentaerythritol hexaacrylate.

A resin, which is uncurable by the application of an ionizing radiation, may also be added to the ionizing radiation-curable resin composition to regulate properties, such as flexibility or surface hardness, of a cured product of the ionizing radiation-curable resin composition. Specific examples of resins include thermoplastic resins, such as polyurethane resin, cellulose resin, polyvinylbutyral resin, polyester resin, acrylic resin, polyvinyl chloride resin, and polyvinyl acetate. Among others, the addition of polyurethane resin, cellulose resin, polyvinylbutyral resin or the like is preferred from the viewpoint of improving the flexibility.

When the ionizing radiation-curable resin composition is cured by the application of light, particularly ultraviolet light, photopolymerization initiators or photopolymerization accelerators are added to the ionizing radiation-curable resin composition. In the case of a resin system having a radically polymerizable unsaturated group, for example, acetophenones, benzophenones, Michler's benzoyl benzoate, α-amyloxime esters, thioxanthones, benzoins, and benzoin methyl ether may be used as the photopolymerization initiator either solely or as a mixture of two or more. In the case of a resin system having a cationically polymerizable functional group, for example, aromatic diazonium salts, aromatic sulfonium salts, aromatic iodonium salts, metallocene compounds, and benzoinsulfonic esters may be used as the photopolymerization initiator either solely or as a mixture of two or more. The amount of the photopolymerization initiator added is 0.1 to 10 parts by weight based on 100 parts by weight of the ionizing radiation-curable resin composition.

In addition, sensitizers, such as n-butylamine, triethylamine, and tri-n-butylphosphine may be used.

The following reactive organosilicon compound may be additionally used in the ionizing radiation-curable resin composition.

For example, the first reactive organosilicon compound usable herein is represented by formula $R_mSi(OR')_n$ wherein R and R' each independently represent an alkyl group having 1 to 10 carbon atoms. The subscript m of R and the subscript n of R' are each an integer which satisfies a requirement represented by m+n=4.

Specific examples thereof include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

Silane coupling agents are usable as the second reactive organosilicon compound in combination with the ionizing radiation-curable resin composition.

Specific examples of silane coupling agents include γ-(2-aminoethyl)aminopropyltrimethoxysilane, γ-(2-aminoethyl) aminopropylmethyldimethoxysilane, β-(3,4-epoxycyclohexyl)ethyltrimethoxysilane, γ-aminopropyltriethoxysilane, γ-methacryloxypropylmethoxysilane, N-β-(N-vinylbenzylaminoethyl)-γ-aminopropylmethoxysilane hydrochloride, γ-glycidoxypropyltrimethoxysilane, aminosilane, methylmethoxysilane, vinyltriacetoxysilane, γ-mercaptopropyltrimethoxysilane, γ-chloropropyltrimethoxysilane, hexamethyldisilazane, vinyltris(β-methoxyethoxy)silane, octadecyldimethyl[3-(trimethoxysilyl)propyl]ammonium chloride, methyltrichlorosilane, and dimethyldichlorosilane.

Ionizing radiation-curable silicon compounds are usable as the third reactive organosilicon compound in combination with the ionizing radiation-curable resin composition.

Specific examples thereof include organosilicon compounds having a plurality of functional groups, which are reacted and crosslinked upon the application of an ionizing radiation, for example, organosilicon compounds having a polymerizable double bond group with a molecular weight of not more than 5,000. More specific examples of the third reactive organosilicon compound include functional polysilanes having vinyl at one terminal, functional polysilanes having vinyl at both terminals, functional polysiloxanes having vinyl at one terminal, functional polysiloxanes having vinyl at both terminals, and polysilanes having vinyl as a functional group or polysiloxanes having vinyl as a functional group produced by reacting these compounds.

More specifically, the following compounds may be mentioned as the third reactive organosilicon compound.

(a)
$$CH_2=CH-(R^1R^2Si)_n-CH=CH_2$$

(b)
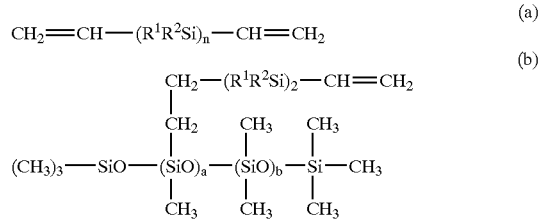

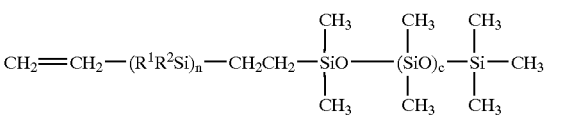

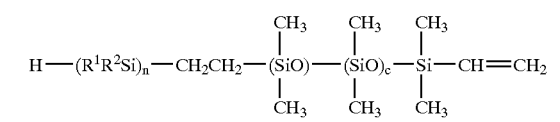

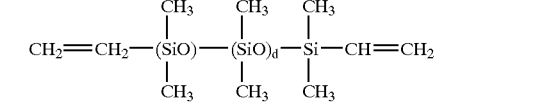

In formulae (a) to (e), $R^1$ and $R^2$ each independently represent an alkyl group having 1 to 4 carbon atoms, and a to d and n are values that bring the molecular weight of the compound to not more than 5,000.

Other organosilicon compounds additionally usable in the ionizing radiation-curable resin composition include (meth) acryloxysilane compounds, such as 3-(meth) acryloxypropyltrimethoxysilane and 3-(meth) acryloxypropylmethyldimethoxysilane.

In the production of the antiglare film 1 according to the present invention, the embossing roller 12 in a roller form has been used in the embodiment described above with reference to FIG. 3. A flat embossing plate may be used instead of the embossing roller.

The surface having concaves and convexes of the molding tool, such as the embossing roller 12 or the flat embossing plate, may be formed by various methods, for example, sandblasting or bead-shot blasting.

In the antiglare film produced using the embossing plate formed by the sandblasting, a large number of concaves (that is, downward projections as viewed in section) are distributed on its surface. On the other hand, in the antiglare film produced using the embossing plate formed by the bead-shot blasting, a large number of convexes (that is, upward projections as viewed in section) are distributed on its surface. Studies conducted by the present inventors have revealed that, when the mean roughness (for example, ten-point mean roughness Rz) is identical, as compared with the antiglare film having a large number of concaves distributed on its surface, the antiglare film having a large number of convexes distributed on its surface has a lower haze value and is less likely to cause light, for example, from interior lighting equipment to be reflected, that is, to cause the image of the interior lighting equipment or the like to be reflected from the antiglare film.

Accordingly, in the antiglare film 1 according to the present invention, more preferably, in addition to the above requirements, an additional requirement should be satisfied such that the antiglare film has been produced by means of a molding tool having concaves and convexes formed by the bead-shot blasting and, in the concaves and convexes on the surface of the antiglare, the proportion of upward projections as viewed in section is higher than the proportion of downward projections as viewed in section. Further, in the production process of an antiglare film according to the present invention, more preferably, a molding tool, which has on its surface concaves and convexes having an inverted shape of concaves and convexes in the antiglare film 1, that is, a molding tool satisfying, in addition to the above requirements, an additional requirement such that the molding tool has been formed by the bead-shot blasting and, in the concaves and convexes on the surface of the molding tool, the proportion of downward projections as viewed in section (that is, concaves) is higher than the proportion of upward projections as viewed in section (that is, convexes), is used as the molding tool for forming concaves and convexes.

Materials usable for constituting a molding tool having concaves and convexes include metals, plastics, and wood and composites of these materials. The metal is preferably chromium from the viewpoints of strength and low susceptibility to abrasion in repeated use. A material prepared by plating the surface of an iron roller with chromium is suitable, for example, for economic reasons.

Particles (beads) usable for blasting include metal particles and inorganic particles, such as silica, alumina, or glass particles. The particle size (diameter) of these particles is preferably about 100 μm to 300 μm.

In blasting these particles against the material for the molding tool, the particles, together with a high-speed gas, are blasted. In this case, the particles, except for the glass beads, may be used in combination with a suitable liquid, such as water. The use of the liquid can realize the formation of a more stable surface shape. The combined use of the glass beads and the liquid, however, causes aggregation of particles which makes it difficult to perform blasting.

Before the use of the molding tool on which concaves and convexes have been formed, the surface of the molding tool is preferably plated, for example, with chromium from the viewpoint of improving durability in service. This can advantageously realize film hardening and prevention of corrosion.

In the production of the antiglare film according to the present invention, preferably, the concaves and convexes on the surface of the molding tool has an inverted shape of concaves and convexes in the antiglare film to be formed.

Accordingly, the inverted shape in the concaves and convexes on the surface of the molding tool for forming concaves and convexes should be as specified above in connection with the concaves and convexes of the antiglare layer in the antiglare film, that is, should satisfy requirements that: (1) the surface of the antiglare layer has a three-dimensional ten-point mean roughness of 0.9 μm to 3 μm; and (2) the mean spacing between adjacent profile peaks on a three-dimensional roughness reference plane is 20 μm to 50 μm.

In use, when the antiglare film 1 according to the present invention is disposed, for example, by applying the antiglare film 1 to a display device on its viewer side in such a manner that the concaves and convexes on the surface of the antiglare layer 3 face the viewer, since the concaves and convexes 4 have a lens effect, light from a display device, such as a liquid crystal display device 101, is randomly refracted. As a result, there is a fear that bright points randomly occur and "glare" occurs on the screen.

In order to avoid the occurrence of this "glare," a method may be adopted wherein a primer layer 5 is provided between the transparent plastic film 2 and the antiglare layer 3 and, in this case, fine organic or inorganic transparent fine particles having a diameter of about 1 μm, such as a polystyrene resin, are incorporated into the primer layer 5. The formation of the primer layer containing transparent fine particles can provide internal light diffusion effect (=internal diffusion) which prevents "glare."

Transparent fine particles, which can be incorporated into the primer layer 5, include, in addition to polystyrene resin beads, acrylic resin beads and silica beads.

Beads used have high transparency and small diameter, and, thus, the incorporation of the transparent fine particles can provide the effect of diffusing light without sacrificing the sharpness of transmitted image.

Preferably, the beads have a particle diameter of 1 to 5 μm and are incorporated in an amount of about 0.8 to 4 (by mass ratio) based on 10 of the transparent resin constituting the primer layer.

In use, the antiglare film 1 according to the present invention is disposed on the uppermost (in the drawing) of the liquid crystal display device 100 described above in conjunction with FIG. 1.

Regarding the disposition of the antiglare film 1, the antiglare film 1 may be mechanically fixed. Preferably, however, a method is adopted wherein either a pressure-sensitive adhesive layer or an adhesive layer is formed on the underside of the antiglare film 1 shown in FIG. 2A or 2B (cross-sectional view) and the assembly is applied onto the upper surface (in the drawing) of the liquid crystal display device 100, generally the liquid crystal panel 101.

A polarizing plate 101a generally has a laminate structure wherein a polarizer is sandwiched between two cellulose triacetate films. Therefore, when the cellulose triacetate film on the viewer side is utilized as a transparent plastic film which is the substrate of the antiglare film according to the present invention, unlike the case where an antiglare film is prepared separately from the polarizing plate and is formed on the polarizing plate, one layer, i.e., the plastic film, and the pressure-sensitive adhesive used at the time of forming can be omitted.

In use, the antiglare film 1 according to the present invention may be merely disposed on the front of display devices, such as liquid crystal display devices, or alternatively may be disposed on the front of a touch panel disposed on the front of display devices, such as liquid crystal display devices.

Figure 4:
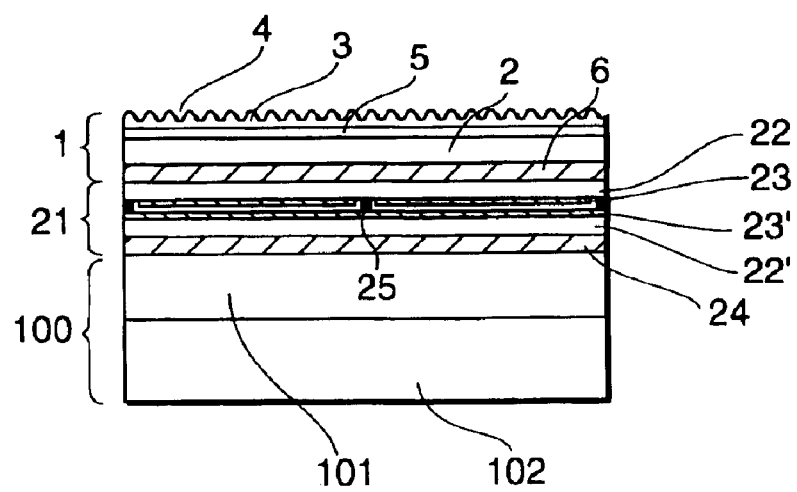
FIG. 4 is a diagram showing an embodiment wherein an antiglare film has been applied to a touch panel.

FIG. 4 is a diagram showing an embodiment wherein an antiglare film 1 has been applied onto the front of a touch panel 21 formed on the front of a liquid crystal display device 100 through an adhesive layer 24.

Figure 1:
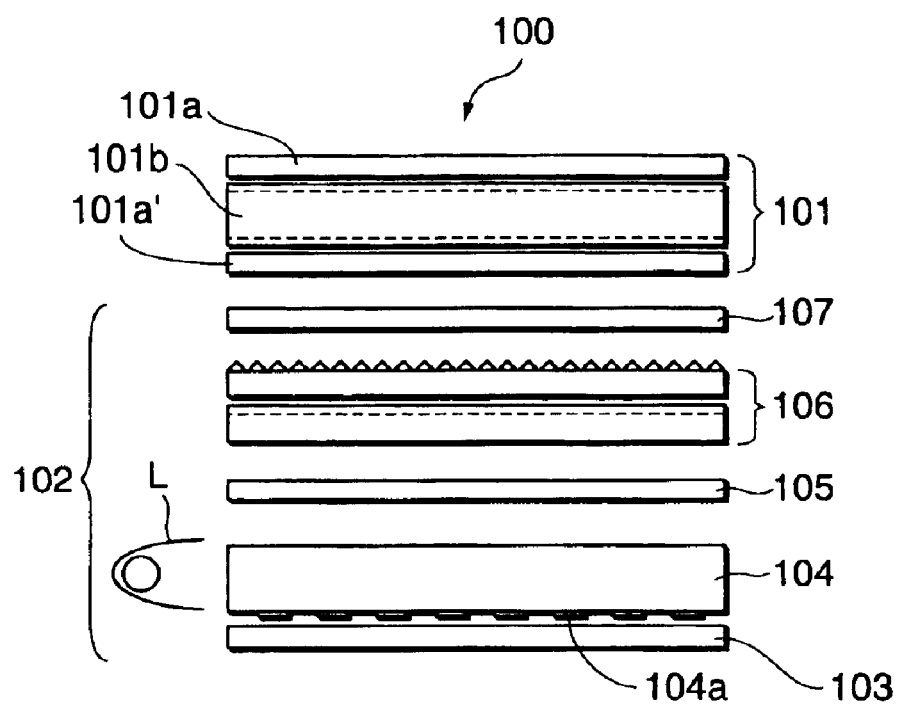
FIG. 1 is a diagram showing a surface light source device and a liquid crystal display device using an antiglare film.

The liquid crystal display device 100 comprises a liquid crystal panel 101 and a surface light source device 102 disposed on the underside of the liquid crystal panel 101, and the liquid crystal display device 100 shown in FIG. 4 corresponds to the liquid crystal display device 100 shown in FIG. 1, except that the details of the liquid crystal display device 100 in FIG. 1 are not shown.

The touch panel 21 is prepared as follows. A first laminate of a transparent conductive layer 23, such as an indium tin oxide layer, formed on the underside of a transparent plastic film 22 is provided. Further, a second laminate of a transparent conductive layer 23', such as an indium tin oxide layer, formed on the upper surface of the transparent plastic film 22' is provided. The first laminate is put and formed on the top of the second laminate so that the transparent conductive layer 23 faces the transparent conductive layer 23' while interposing a spacer 25 therebetween. In this touch panel 21, the application of a pressure onto the upper side of the touch panel brings the transparent conductive layers 23 and 23' into contact with each other and thus brings about an electrically conducting state and enables inputting. This touch panel 21 is only one example, and the touch panel may be any one so far as input can be done by pressing.

The antiglare film 1 comprises: a transparent plastic film 2; a primer layer 5 and an antiglare layer 3 having fine concaves and convexes 4 on its upper surface formed in that order on the upper surface of the transparent plastic film 2; and a pressure-sensitive adhesive layer 6 provided on the underside of the transparent plastic film 2.

As shown in FIG. 4, in an assembly comprising a liquid crystal display device 101 and, formed on the liquid crystal display device 101 in the following order, a touch panel 21 and an antiglare film 1, pressing the top of the antiglare film 1 in its predetermined selected site by a finger or a touch pen according to indication on the screen of the display in the liquid crystal display device 101 can permit input utilizing the touch panel 21. The antiglare film 1 does not substantially deteriorate the visibility of the screen of display devices and, at the same time, has excellent durability such as excellent surface scratch resistance and thus can be stably used for a long period of time.

EXAMPLES

The present invention will be described in more detail with reference to the following examples and comparative examples.

Example 1

An iron roller was provided. Concaves and convexes were formed on the surface of the roller by bead-shot blasting using glass beads having a size of 100 mesh (particle diameter distribution: 106 to 150 $\mu$m). The surface of concaves and convexes was plated with chromium to a plating thickness of 5 $\mu$m to prepare an embossing roller.

In the bead-shot blasting, the blasting pressure, the space between the blasting nozzle and the roller and the like were regulated, and the embossing roller thus obtained had a three-dimensional ten-point mean roughness of 0.9 to 3 $\mu$m and a spacing between adjacent concaves (profile valleys) of 20 to 50 $\mu$m.

A 75 $\mu$m-thick polyethylene terephthalate resin film (stock number: A 4300, manufactured by Toyobo Co., Ltd.) was provided as a transparent plastic film. A composition prepared by mixing a polyurethane resin primer coating material (a medium main agent for chemical mat varnish, curing agent (XEL curing agent (D), manufactured by The Inctec Inc.) in a mass ratio of main agent to curing agent to solvent of 10:1:3.3 was gravure coated on the transparent plastic film, and the coating was dried to form a 3 $\mu$m-thick primer layer. The solvent used was a mixed solvent composed of toluene and methyl ethyl ketone in a ratio of 1:1. Here the mixing ratio is by mass (the same shall apply hereinafter).

The apparatus, which has been described above with reference to FIG. 3, was provided, and an ultraviolet-curable resin (Unidic RC 20-058, manufactured by Dainippon Ink and Chemicals, Inc.) was coated on the embossing roller. The transparent plastic film with the primer layer formed thereon was laminated onto the coated embossing roller so that the primer layer faced the coating on the embossing roller. Subsequently, ultraviolet light was applied from an ultraviolet light source (D-bulb, manufactured by Fusion) to the laminate through the transparent plastic film. Thereafter, the laminate was separated from the embossing roller to prepare an antiglare film provided with an antiglare layer having concaves and convexes on its surface according to the present invention.

Example 2

An antiglare film was prepared in the same manner as in Example 1, except that, in forming the primer layer, 3 parts of organic material beads (polystyrene resin beads, stock number: MX-130H, manufactured by Soken Chemical Engineering Co., Ltd.) were added based on 10 parts of the main agent to the composition to render the primer layer light diffusive.

Comparative Example

A silica bead-containing ultraviolet-curable resin composition was coated directly on a transparent plastic film (as used in Example 1) without the formation of a primer layer by means of a gravure reverse coater. Thus, an antiglare layer having concaves and convexes was formed by coating only.

The antiglare films prepared in Examples 1 and 2 and Comparative Example were evaluated for the following items: (1) (1a) total light transmittance and (1b) haze; (2) (2a) three-dimensional surface roughness and (2b) mean spacing between adjacent profile peaks; (3) sharpness (distinctness) of transmitted image; (4) external light reflection preventive property; (5) antiglare property; and (6) scratch resistance.

(1) (1a) The total light transmittance and (1b) haze were measured with a haze meter ("direct reading haze meter," manufactured by Toyo Seiki Seisaku Sho, Ltd.).

(2) (2a) Three-dimensional surface roughness and (2b) mean spacing between adjacent profile peaks were measured with a surface roughness meter ("SURFCORDER SE-30 K," manufactured by Kosaka Laboratory Ltd.). Both the three-dimensional surface roughness and the mean spacing between adjacent profile peaks were expressed in $\mu$m.

(3) A measurement was carried out using four optical combs (four slit widths of 0.25 mm, 0.5 mm, 1 mm, and 2 mm) according to the measuring method for image sharpness for transparent samples according to JIS K 7105 6.6, and the total of the measured values was regarded as the sharpness (distinctness) of transmitted image. The larger the numeric value, the higher the sharpness of transmitted image. The measuring apparatus used was an image clarity measuring apparatus "ICP-1PD" manufactured by Suga Test Instruments Co., Ltd.

(4) In the measurement of the external light reflection preventive property, light was applied to the sample through a square mask. In this case, an image clarity evaluation apparatus "MJ-RTS" manufactured by MIZOJIRI OPTICAL CO., LTD. was provided, the luminance of the reflected image was caught in the regular reflection direction, and the light application angle was varied to determine the distribution of luminance relative to the application angle and to prepare a graph based on the results, followed by the determination of the maximum inclination angle in the graph. In the case of a film not subjected to antiglare treatment, since the luminance rapidly increases at the light application boundary portion, the angle value is substantially equal to 90 degrees. The smaller the numeric value, the lower the level of the external light reflection and the higher the antiglare property.

(5) In the measurement of the antiglare property, the sample was applied to the front of a color filter in a liquid crystal display device, and the surface of the sample was photographed with an image clarity evaluation apparatus "MJ-RTS" manufactured by MIZOJIRI OPTICAL CO., LTD. to determine the standard deviation of the luminance, within the screen, as the level of the antiglare property. The smaller the numeric value indicating the level of the antiglare property, the lower the glare level.

(6) In the measurement of the scratch resistance, steel wool #0000 was provided and reciprocated on the sample while applying a load of 2000 g to the steel wool to determine, as a numeric value indicating the scratch resistance, the number of times of reciprocation necessary for causing a noticeable scratch.

The results of evaluation for the above items (1) to (6) are summarized in Table 1. In Table 1, the numbers in parentheses are the same as those in the above evaluation items.

TABLE 1

| | Evaluation items | Ex. 1 | Ex. 2 | Comp. Ex. |
|---|---|---|---|---|
| (1a) | Total light transmittance | 89.2 | 88.3 | 87.4 |
| (1b) | Haze | 12.4 | 25.3 | 8.1 |
| (2a) | Three-dimensional surface roughness | 0.935 | 0.935 | 1.01 |
| (2b) | Mean spacing between adjacent profile peaks | 25.33 | 25.33 | 21.99 |
| (3) | Sharpness of transmitted image | 203.9 | 200.2 | 150.2 |
| (4) | External light reflection preventive property | 72 | 72 | 30 |
| (5) | Antiglare property | 17 | 8 | 28 |
| (6) | Scratch resistance | 90 | 90 | 20 |

The antiglare films prepared in Examples 1 and 2 are superior to the antiglare film prepared in the comparative example in sharpness of transmitted image and scratch resistance.

Further, in the antiglare film prepared in Example 2, the incorporation of organic material beads into the primer layer provided internal diffusion effect and, by virtue of this, imparted an improved antiglare property to the antiglare film as compared with the antiglare property of the antiglare film prepared in Example 1.

The antiglare film according to the first aspect of the present invention, when disposed on the front of a display device, such as a liquid crystal display device, can exhibit excellent external light reflection preventive property and scratch resistance.

In an embodiment of the antiglare film according to the present invention wherein the total light transmittance of the antiglare film is not less than 87% and the haze of the antiglare film is 5 to 40, in addition to the above effect, an additional effect can be attained such that the disposition of the antiglare film on the front of a display device causes substantially no deterioration in luminance of images and, at the same time, glare is less likely to occur while maintaining the sharpness of images.

In another embodiment of the antiglare film according to the present invention wherein the antiglare layer is formed of a cured product of an ionizing radiation-curable resin, in addition to the above effects, an additional effect can be attained such that the antiglare film has excellent physical resistance, such as excellent scratch resistance, and excellent chemical resistance and, further, imparting concaves and convexes by means of an embossing plate and curing the resin can be reliably carried out at a high speed.

In a further embodiment of the antiglare film according to the present invention wherein a primer layer is additionally provided between the transparent plastic film and the antiglare layer, the antiglare film has improved adhesion strength between the transparent plastic film and the antiglare layer.

In a still further embodiment of the antiglare film according to the present invention wherein the primer layer contains transparent fine particles, in addition to the above effect described just above in connection with the provision of the primer layer, an additional effect can be attained such that glare can be suppressed by virtue of internal diffusion.

In the production process of an antiglare film according to the present invention wherein a tool having predetermined concaves and convexes is used as a molding tool and an ultraviolet-curable resin is used as a material, the shape of the concaves and convexes in the molding tool are faithfully reproduced on the antiglare layer and, in addition, imparting concaves and convexes by means of an embossing plate and curing the resin can be carried out at a high speed.

In an embodiment of the production process according to the present invention wherein the molding tool is in a roller form, in addition to the above effect, a further effect can be attained such that the processing can be continuously carried out while rotating the molting tool and, thus, this constitution is suitable for the production of an antiglare film in a continuous sheet form using a continuous transparent plastic film.

In another embodiment of the production process according to the present invention wherein a transparent plastic film with a primer layer being formed on its side where the ionizing radiation-curable resin is to be formed, in addition to the above effect, a further effect can be attained such that the produced antiglare film has improved adhesion strength between the transparent plastic film and the antiglare layer.

In a further embodiment of the production process according to the present invention wherein the primer layer contains transparent fine particles, in addition to the above effect, a further effect can be attained such that the produced antiglare film is improved in antiglare properties by virtue of internal diffusion.

According to a further aspect of the present invention, there is provided an antiglare film produced by any one of the above production processes.

According to a still further aspect of the present invention, there is provided a display device comprising any one of the above antiglare films having the above various effects disposed on the front of a display. Therefore, this display device can have an additional effect attained by the antiglare film.

What is claimed is:

1. A process for producing an antiglare film, comprising the steps of:

bringing a transparent plastic film in a molding tool having on its surface concaves and convexes which have an inverted shape of fine concaves and convexes of the antiglare layer to be formed;

placing an ionizing radiation-curable resin between the transparent plastic film and the molding tool;

applying an ionizing radiation to the ionizing radiation-curable resin to cure the ionizing radiation-curable resin and to adhere the cured product of the ionizing radiation-curable resin to the transparent plastic film, thereby forming an antiglare layer having fine concaves and convexes on its surface; and separating the transparent plastic film with the antiglar layer formed thereon from the molding tool, said antiglare layer satisfying requirements that:

(1) the surface of the antiglare layer has a three-dimensional ten-point mean roughness of 0.9 $\mu$m to 3 $\mu$m; and (2) the mean spacing between adjacent profile peaks on a three-dimensional roughness reference plane is 20 $\mu$m to 50 $\mu$m.

2. The process according to claim 1, wherein the molding tool is in a roller form.

3. The process according to claim 1, wherein the primer layer is formed on a surface on the transparent plastic film and the ionizing radiation-curable resin is coated on a surface of the primer layer.

4. The process according to claim 1, wherein the primer layer comprises transparent fine particles.

5. An antiglare film produced by the process according to claim 1.

6. An antiglare film produced by the process according to claim 2.

7. An antiglare film produced by the process according to claim 3.

8. An antiglare film produced by the process according to claim 4.

* * * * *